United States Patent [19]
Kadoi et al.

[11] Patent Number: 4,539,392
[45] Date of Patent: Sep. 3, 1985

[54] METHOD OF PREPARING POLYIMIDE PREPOLYMER FROM ETHYLENICALLY UNSATURATED DICARBOXYLIC ACID COMPOUND

[75] Inventors: Sho Kadoi; Toshihiko Aya, both of Aichi, Japan

[73] Assignee: Toray Industries, Inc., Tokyo, Japan

[21] Appl. No.: 627,511

[22] Filed: Jul. 3, 1984

[51] Int. Cl.$^3$ .............................................. C08G 73/12
[52] U.S. Cl. .................................... 528/336; 528/172; 528/173; 528/179; 528/183; 528/185; 528/189; 528/322; 528/345
[58] Field of Search ............... 528/336, 322, 179, 183, 528/185, 189, 172, 173, 345

[56] References Cited

U.S. PATENT DOCUMENTS 3,732,189  5/1973  Crivello et al. .................... 528/336
4,465,823  8/1984  Berger et al. ....................... 528/336

Primary Examiner—Harold D. Anderson
Attorney, Agent, or Firm—Austin R. Miller

[57] ABSTRACT

Polyimide prepolymers having excellent heat resistance can be prepared in one stage by the reaction of polyamines and aromatic double bond-containing dicarboxylic acids or derivatives thereof in the presence of oxide compounds of phosphorus without isolating any intermediate in the course of said reaction.

15 Claims, No Drawings

METHOD OF PREPARING POLYIMIDE PREPOLYMER FROM ETHYLENICALLY UNSATURATED DICARBOXYLIC ACID COMPOUND

BACKGROUND OF INVENTION

1. Field of the Invention

The present invention relates to a novel method of preparing polyimide prepolymers having excellent heat resistance from polyamines and dicarboxylic acids having aliphatic double bonds or derivatives thereof.

2. Description of the Prior Art

One of the methods well known for preparing polyimide prepolymers is a two stage process in which a double bond-containing imide compound is isolated after being prepared from a polyamine and an aliphatic dicarboxylic anhydride or a derivative thereof equivalent to the amino group of the polyamine and subsequently the obtained imide compound is reacted with a polyamine to prepare a polyimide prepolymer. For example, maleamic acid obtained by reaction of 1 mole of maleic anhydride with 0.5 mole of diaminodiphenylmethane undergoes imide ring closure to form bismaleimide (U.S. Pat. No. 3,839,358 for example) and the bismaleimide is reacted with diaminodiphenylmethane to yield a polyaminobismaleimide prepolymer. This method is conventionally used (U.S. Pat. No. 3,562,223 and U.S. Pat. No. 3,658,764 for example) and commercialized already.

However, this two stage method is economically disadvantageous because of the complexity of its first stage process in which a double bond-containing imide compound is prepared in advance, followed by isolation and refining. Therefore, there have been studied in the industry concerned one stage methods in which a polyamidic acid prepolymer obtained by reaction of dicarboxylic anhydride having aliphatic double bonds with a diamine of excess equivalent is subjected to dehydrating ring closure to prepare a polyimide prepolymer. As a result, two methods using different means of dehydrating ring closure are proposed. One of the two methods is the heat ring closure method in which an azeotropic water removing agent such as benzene (Published Unexamined Japanese patent application No. 4644/71 and 99296/73, for example) or a sulfuric acid catalyst (Published Unexamined Japanese patent application No. 3846/71) is usually used in order to accelerate the heat ring closure. The other one is the acetic anhydride method (Published Unexamined Japanese patent application No. 18119/74, for example) in which an acetic anhydride is used in combination with a metal salt of acetic acid and tertiary amine as the accelerator. However, the former heat ring closure method of these conventional one stage methods is almost impracticable because it has such drawbacks that the imide ring closure rate of the finally obtained polyimide prepolymer is as low as 50 to 70% to leave a considerable amount of amide unit and therefore that foaming occurs during curing of the prepolymer to form a number of voids in the molding. Also, the latter acetic anhydride method has the vital drawback that although the imide ring closure rate of the finally obtained polyimide prepolymer can be brought to a practicable level as high as more than 90%, the curing speed of the prepolymer during molding is very slow, and yet the heat resistance of the finally obtained cured molding is extremely low.

SUMMARY OF THE INVENTION

An object of the present invention is to provide a novel method capable of preparing in one stage polyimide prepolymers from dicarboxylic acids having aliphatic double bonds or derivatives thereof and polyamines of excess equivalent, without isolating the intermediate in the course of the synthesis.

Another object of the invention is to prepare polyimide prepolymers having a practicable curing speed, wherein no foaming occurs during curing and which is capable of forming a cured molding excellent in heat resistance., These objects of the present invention have been attained effectively according the method of the present invention, that is, the method of preparing polyimide prepolymers which comprises effecting reaction between a polyamine represented by the following general formula (I), $$R\text{—}(NH_2)_n \quad (I)$$

where R is an organic group having not less than 2 carbon atoms and n is an integer of 2 or above, and a compound selected from a group consisting of dicarboxylic acids having aliphatic double bonds and derivatives thereof in the ratio of not less than 0.52 moles and less than 0.95 moles of the latter per mole of amino group contained in said polyamine in the presence of a ring closing amount of an oxide compound of phosphorus.

DESCRIPTION OF THE PREFERRED EMBODIMENTS

Polyamines used in the present invention are compounds represented by the general formula $R\text{—}(NH_2)_n$ (where R is an organic group having at least two carbon atoms and n is an integer of 2 or above), and R includes an aliphatic group, aromatic group, alicyclic group or hetero ring group, or a combination of these combined groups, or these groups linked by oxygen, sulfur, —CO—, —CONH—, —SO—, —SO$_2$—,

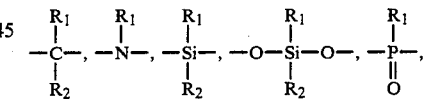

(where $R_1$ and $R_2$ are aliphatic, aromatic and alicyclic groups). In addition, these polyamines may have substituents inert to the reaction of the present invention introduced, such as an alkoxy group, aryloxy group, halogen group, etc. Examples of the above-mentioned polyamine are metaphenylenediamine, paraphenylenediamine, 4,4'-diaminodiphenylmethane, 3,3'-diaminodiphenylmethane, 4,4'-diaminodiphenylpropane, 3,3'-diaminodiphenylpropane, 4,4'-diaminodiphenylether, 3,3'-diaminodiphenylether, tolylenediamine, 4,4'-diaminodiphenylsulfone, 3,3'-diaminodiphenylsulfone, 4,4'-diaminodiphenylsulfide, para-bis (4-aminophenoxy) benzene, meta-bis (4-aminophenoxy) benzene, 1,5'-diaminonaphthalene, 3,3'-dimethyl-4,4'-diaminobiphenyl, 3,4'-diaminobenzanilide, 4-(para-aminophenoxy)-4- aminobenzanilide, 3,4'-diaminodiphenylether, 3,3'-dimethoxybenzidine, 2,4-bis (beta-amino-tertiary butyl) toluene, bis (para-beta-amino-tertiary butylphenyl)ether, para-bis (4-aminophenoxy) diphenylsulfone, para-bis (3-aminophenoxy) diphenylsulfone, 4,4'-diaminobenzophenone, 1,3,5-triaminobenzene, 3,4,4'-triaminodiphenylether, melamine, 1,3,5-triaminonaphthalene, meta-xylenediamine, para-xylenediamine, hexamethylenediamine, heptamethylenediamine, 4,4-dimethylheptamethylenediamine, 1,4-diaminocyclohexane, diaminocyclohexylmethane and compounds represented by the following general formula,

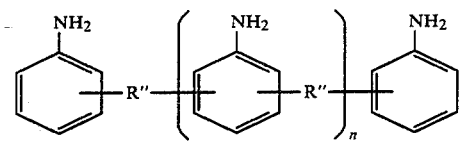

(where R" denotes alkylene group or aralkylene group). Also, the above-mentioned compounds may be used with halogen, alkyl and alkoxy substituents introduced.

These polyamines are used as one member or as a mixture of at least two members. Among them, 4,4'-diaminodiphenylmethane, meta-phenylenediamine and 4,4'-bis (p-aminophenoxy) diphenylpropane are preferred.

Compounds of the invention selected from a group consisting of dicarboxylic acids having aliphatic double bonds and derivatives thereof include maleic anhydride, citraconic anhydride, itaconic anhydride, tetrahydrophthalic anhydride, nadic anhydride, alkylester derivatives of these anhydrides, dicarboxylic acids themselves of these anhydride and halogen-substituted compounds and alkyl-substituted compounds thereof. These compounds (hereinafter abbreviated to acid components) selected from a group consisting of dicarboxylic acids having aliphatic double bonds and derivatives thereof are used in one member or a mixture of at least two members. Among them, maleic anhydride is used preferably.

Oxide compounds of phosphorus used in the present invention serve as imide ring closing agents, and include phosphorus pentaoxide, phosphorus sesquioxide, metaphosphoric acid, pyrophosphoric acid, tripolyphosphoric acid, polyphosphoric acid, etc.

These oxide compounds of phosphorus are used as one member or as a mixture of at least two members, among which phosphorus pentaoxide and polyphosphoric acid are used preferably.

The reaction of the polyamine and the acid component in the present invention can proceed in the absence of solvent as well as in the presence of solvent. There can be used another third method in which the reaction is effected in an organic medium that can dissolve the polyamine and acid component as the starting material but does not dissolve more than 50 weight percent of the reaction product, and wherein at least a part of the organic medium is distilled out during the reaction to bring the rest of the organic medium to less than 50% at completion of the reaction.

Solvents and media used in the present invention include nitrogen-containing aprotic polar solvents, such as N,N-dimethylformamide, N,N-diethylformamide, N,N-diethylacetamide, N-methylpyrrolidone, N-methylcaprolactam, tetramethyl urea, hexamethylenephosphor amide, 1,3-dimethyl-2-imidazolidinone, etc., halogenated hydrocarbons, such as methylene chloride, chloroform, carbon tetrachloride, dichloroethane, trichloroethane, tetrachloroethane, dichloroethylene, trichloroethylene, tetrachloroethylene, chlorobenzene, etc., ethers such as tetrahydrofuran, dioxane, etc., alcohols such as methanol, ethanol, propanol, butanol, etc., cellosolves such as methyl cellosolve, ethyl cellosolve, propyl cellosolve, etc., and ketones such as acetone, methylethyl ketone, cyclohexane, etc. When the nitrogen-containing aprotic polar solvents are used among the above-mentioned solvents and media, the reaction proceeds in a homogeneous system as acid components, polyamines, oxide compounds of phosphorus and amidic acid compounds of the intermediate are dissolved in general in these solvents. The other compounds are an organic medium of such the type that dissolve polyamine and acid component as the starting material but does not dissolve more than 50 weight percents of the reaction product.

In a case of using an imide ring closing agent in a solution state, a homogeneous solution is prepared by dissolving in advance the imide ring closing agent in the above-mentioned nitrogen-containing aprotic polar solvent. Vigorous stirring is necessary in dissolving phosphorus pentaoxide in the polar solvent. In some cases, insufficient stirring would cause adhesion between undissolved solids, resulting in extremely poor solubility. Therefore, the use of a homomixer having good stirring performance is advisable. An example of dissolving procedures is described below.

A ring closing agent is added gradually with stirring in a solvent which has been provided beforehand. In this case, heating, though heightening solubility, is not always necessary since heat generation occurs in the process of dissolving. In preparing a large volume of highly concentrated solution, cooling is needed since there are vigorously generated heat of dissolution and heat of reaction of a ring closing agent with a trace amount of water content in the solvent. The solubility varies with the combination of solvent and ring closing agent. A solution having a concentration of about 50 weight percents can usually be prepared in a case of dissolving a solid ring closing agent in a nitrogen-containing aprotic polar solvent.

In addition, even for the bulk synthesis which is caused during the reaction in the case where the organic medium is distilled out during the reaction which proceeds in the organic medium that dissolves polyamine and acid component of the starting material but does not dissolve more than 50 weight percent of the reaction product, the reaction of the present invention can be effected without posing any problem.

Under such a condition, rather better results can often be obtained because the concentration of the reactants is heightened and, therefore, the reaction is accelerated. In addition, since affinity between the reaction product and organic solvent is small, it becomes easy in the after-treatment process to remove volatile compounds owing to the organic solvent contained in the reaction product.

The amunt of imide ring closing agent used in the present invention is preferably 0.1 to 10 (more preferably 0.4 to 3) dehydrating equivalents per mole of the acid component.

In the present invention, not less than 0.52 moles and less than 0.95 moles (preferably 0.6 to 0.8 moles) of the acid component is used for 1 mole of amino group contained in the polyamine. The presence of not less than 0.95 moles of the acid component is undesirable because the whole amino group contained in the polyamine is substantially imidized and a cured compound obtained by curing the resulting compound becomes brittle and easy to have crack. On the other hand, when the acid component is present in an amount less than 0.52 moles per mole of amino group, the amount of double bond contained in the resulting compound is undesirably lessened to give sufficient curing ability to the resulting compound.

In effecting the reaction of the present invention, there is no particular limitation on the order of in addition of polyamine, acid component, and oxide of phosphorus as the imide ring closing agent. For example, it is possible to provide a polyamine, an acid component and an imide ring closing agent at the same time to effect the reaction, and is also possible to first synthesize an amidic acid prepolymer by reaction, of polyamine and an acid component, and subsequently to add the imide ring closing agent. There is also an additional third method, in which an imide ring closing agent is first added into a solvent, and subsequently the acid component and the polyamine are added. This third method is advantageous as being capable of heightening the concentration of reactants in the reaction system when employing a nitrogen-containing aprotic polar solvent.

The reaction of the present invention is effected ususally for 0.1 to 10 hours, preferably 0.3 to 5 hours, under the temperature condition of 10° to 200° C., preferably 70° to 200° C. When the polyamidic acid formation and imide ring closure are conducted in two stages, the polyamidic acid forming reaction in the first stage is effected usually at 0° to 150° C., preferably at 10 to 100° C., for 0.05 to 5 hours. The dehydrating ring closure reaction of polyamidic acid is usually effected at 10° to 200° C., preferably at 70° to 200° C., for 0.05 to 5 hours.

The polyimide prepolymer thus obtained by the method according to the present invention can be subjected to subsequent curing. The polyimide prepolymer can be cured solely with no problem posed but also various types of compounds may be used as the curing agent. These curing agents include, as mentioned above, polyamines, isocyanuric acid and derivatives thereof, cyanuric acid and derivatives thereof, triazines, cyanic acid esters (including prepolymers thereof), unsaturated polyesters, epoxy resins, polyphenols, polythiols, ureas, thioureas, imines, Schiff bases, hydrazide compounds, hydrazines, amide compounds, oxazoles, barbituric acid and derivatives thereof, oxazolines, hydantoin compounds, cyanoacrylates, epoxy-modified amines, isocyanates oximes, phenolformalin resin, amino-modifed novolak, alyzines, dicyanamides, imidazoles, sulfonamides, azomethine compounds, polycarboxylic acids, azadiene compounds, quinazolone compounds, piperazine compounds, indoles, thioisocyanates, acrylamides, olefin compounds, diene compounds and derivatives thereof, etc. The polyimide prepolymer of the present invention can be cured after being blended with various types of polymers. Such polymers include various types of polyamides, various types of polyesters, fluorine resins, polysulfones, polyacetals, linear polyimides, polyamideimides, polyphenyleneoxides, polyphenylene sulfides, polyethylene, polypropylene, polystyrene, acrylonitrile-styrene copolymer, polyvinyl chloride, ABS resin, polybutadiene, ethylene-propylene rubber, NBR, acryl rubber, chloroprene rubber, etc.

The polyimide prepolymer obtained according to the present invention can be cured by not only heating but also irradiation of high energy electron beam, X-rays, etc. The polyimide prepolymer of the present invention, though having good curability when taken alone, may be used in combination with curing accelerators such as organic peroxides, $BF_3$-amine complexes, etc. depending upon the applications.

As mentioned above, the present invention can provide a method capable of preparing, in one stage in the presence of oxide compounds of phosphorus, polyimide prepolymers which can from a cured molding at a practicable curing speed, with no foaming occurring during curing, and having excellent heat resistance.

The polyimide prepolymer obtained according to the present invention may be combined with fillers. Such fillers include glass fiber, glass beads, graphite, carbon fiber, silica, asbestos, titanium oxide, etc. The polyimide prepolymer obtained according to the present invention may be blended with other polymers.

The polyimide prepolymer of the present invention can be used as materials for laminated sheets and molding such as casting and as varnish, coating compositions, and so on. The cured product is excellent in heat resistance, chemical resistance and mechanical properties, and is used suitably on electric appliance parts, mechanical parts, automobile parts and aircraft parts.

The present invention will be further described with reference to the following examples.

EXAMPLE 1

In a 1 1 flask equipped with stirrer, thermometer, dropping funnel and reflux condenser, 148.7 g (0.75 mole) of 4,4'-diaminodiphenylmethane and 300 ml of N-methylpyrrolidone (hereinafter abbreviated to NMP) were provided and dissolved with stirring. Next, a solution of 98.1 g (1.0 mole) of maleic anhydride dissolved in 200 ml of NMP was added gradually through the dropping funnel. After the addition the resulting solution was allowed to continue reaction at 30° C. for one hour to form polymaleamic acid prepolymer and subsequently a solution of 71 g (0.5 mole) of phosphorus pentaoxide dissolved in 150 ml of NMP was added gradually. After the addition the solution was heated to 100° C. and allowed to continue reaction at the temperature for one hour.

Next, the reaction mixture was cooled to room temperature and poured into 5 l of ice water with vigorous stirring to precipitate prepolymer and then filtration was carried out. The slurry was prepared by adding a new water to the resulting filtrate and to this slurry a sodium carbonate aqueous solution was added until the suspension was brought to pH 9.5. The prepolymer was filtrated out from the suspension and washed thoroughly with water. After the product was vacuum dried at 70° C. for 15 hours, 217 g (yield: 94.1%) of prepolymer of light yellow in color was obtained.

When the prepolymer thus obtained was subjected to analyses by means of IR, NMR and alkali titration, the product proved to have an imide ring closure rate of not less than 96% with large amounts of primary amino group and double bond detected.

When the obtained polyimide prepolymer was molded with press for 10 min under the conditions of temperature of 230° C. and a pressure of 70 kg/cm², a satisfactorily cured molding was obtained with no any foam and any void observed. After being aftercured at 200° C. for 24 hours, the molding was measured to determine properties. As a result, the product proved to be excellent in thermal and mechanical properties, having a heat deflection temperature (ASTM-D648) of not less than 300° C. and a flexural strength (ASTM-D790) of 1,420 kg/cm2.

COMPARATIVE EXAMPLE 1

Polymaleamic acid prepolymer was prepared through the same operation as that in the first half of Example 1. Subsequently, the reflux condenser was replaced by a distilling out apparatus, the reaction mixture was raised to 140 ° C. after 100 ml of toluene was added and azeotropic mixture of toluene/water was continuously distilled out for 1.5 hours.

Subsequently the reaction mixture was cooled to room temperature and poured into 5 l of ice water to precipitate prepolymer. After being filtrated out, the prepolymer was thoroughly washed with methanol and subsequently with water and vacuum dried at 70° C. for 15 hours. As a result, 215 g (yield: 94.2%) of light yellowish brown colored prepolymer was obtained.

The obtained prepolymer had only an imide ring closure rate of 78% and the rest 22% remained as amidic acid unit. When this prepolymer was molded with press under the same condition as Example 1, violent foaming occurred to make normal molding impossible.

COMPARATIVE EXAMPLE 2

After polymaleamic acid prepolymer was prepared through the same operation as that in the first half of Example 1, 130 g (1.28 mole) of acetic anhydride as the imide ring closing agent, 17.5 g (0.145 mole) of dimethylaniline and 1 g (0.00383 mole) of cobalt acetate as the catalyst were added. After the addition the mixture was heated to 120° C. and allowed to continue reaction at the temperature for 2 hours. Next, when the reaction mixture was post-treated in the same manner as in Example 1, 241g (yield 105,3%, on the basis of provided maleic anhydride) of light yellowish brown colored prepolymer was obtained.

When the obtained prepolymer was analized in the same manner as in Example 1, then it followed that the imide ring closure rate was as high as 98% but that no primary amino group was detected and instead a large amount of acetylamide group was detected. Subsequently, when the obtained prepolymer was subjected to press molding under the same condition as Example 1, then the product remained as soft as rubber even after 40 minutes of heating which was 4 times as long as Example 1 and had so extremely poor curability that it could not be taken out from the mold.

It has proved from the above results that when conventional acetic anhydride was used in place of oxide compound of phosphorus as the imide ring closing agent of the present invention, the terminal primary amino group of the prepolymer is acetylated to aggravate the hardening activity to a large extent.

COMPARATIVE EXAMPLE 3

After polymaleamic acid prepolymer was prepared through the same operation as that in the first half of Example 1, the reflux condenser was replaced by a distillation apparatus, 10 g (0.102 mole) of sulfuric acid as the imide ring closing catalyst and 100 ml of toluene as the azeotropic dehydrating agent were added, followed by heating up to 140° C., and azeotropic mixture of toluene/water was distilled out continuously for 1.5 hours.

Next, the reaction mixture was cooled to room temperature and poured into 5 l of ice water with vigorous stirring to precipitate prepolymer and then filtration was carried out. The slurry was prepared by adding a new water to the resulting filtrate and to this slurry a sodium carbonate aqueous solution was added until the solution was brought to pH 9.5. After being filtrated out and washed thoroughly with water, the prepolymer was vacuum dried at 70 ° C. for 15 hours. As a result, 214 g (yield: 93.5%) of light yellowish brown colored prepolymer was obtained.

When the obtained prepolymer was subjected to analyses by alkali titration, IR and NMP, then the imide ring closure rate was only 86% and the rest 14% remained as amidic acid unit. When this prepolymer was molded with press under the same conditions as Example 1, foaming occurred and only, amolding containing a large amount of voids was obtained.

EXAMPLE 2

Methylene chloride of 600 g, 39.2 g (0.4 mole) of maleic anhydride and 59.6 g (0.3 mole) of 4,4'-diaminodiphenylmethane were provided in a 1 l stainless steel-made separable flask equipped with stirrer, thermometer and distillation apparatus and subsequently 30 g (0.21 mole) of phosphorus pentaoxide was added gradually with violent stirring. After the addition, methylene chloride was distilled out from the partially slurry-formed mixture while the reaction was continued by heating. After 40 minutes, when the interior temperature was 65° C. and a most part of methylene chloride was distilled out, the stirring was stopped and heating was continued further. The interior temperature was 150° C. in 70 minutes after the start of heating and the reaction mixture was allowed to continue reaction at the temperature for 20 minutes, immediately followed by cooling.

After being taken out, the reaction mixture solid was vacuum dried at 70° C. for 17 hours through such processes in succession as grinding, washing with pure water, thoroughly washing with 1% sodium carbonate aqueous solution and pure water and dehydration. As a result, 88 g (yield: 96.1%) of light brown colored prepolymer was obtained.

When the obtained prepolymer was subjected to IR analysis, large amounts of primary amino group and double bond were detected, while amidic acid was judged to undergo almost perfect imide ring closure with no absorption of amidic acid detected.

When 60 g of the obtained polyimide prepolymer was dry blended with 40 g of glass bead and molded with press under the conditions of a temperature of 230° C. and a pressure of 150 kg/cm$^2$, a sufficiently cured molding was obtained with no foam and void observed. After being aftercured at 200° C. for 24 hours, the obtained molding was measured to determine properties. As a result, it proved that the molding has excellent thermal and mechanical properties such as a heat deflection temperature (ASTM-D648) of not less than 300° C. and a flexural strength (ASTM-D790) of 1,200 kg/cm2.

EXAMPLE 3

Phosphorus pentaoxide of 71 g (0.5 mole) and 200 ml of N-dimethylformamide (hereinafter abbreviated to DMF) were provided in an apparatus similar to that in Example 1 and homogeneously dissolved with vigorous stirring. After 58.8 g (0.6 mole) of maleic anhydride was added and dissolved with strring, a solution containing 60.0 g (0.3 mole) of diaminodiphenylether and 21.6 g (0.2 mole) of meta-phenylenediamine dissoved in 250 ml of DMF was added gradually, after which the mixture was heated to 100° C. and allowed to continue reaction at this temperature for one hour.

As a result of the same post-treatment as in Example 1 applied to the obtained reaction mixture, 118 g (yield: 91.1%) of light brown colored prepolymer was obtained. When the obtained prepolymer was subjected to the same analysis as Example 1, the imide ring closure rate was not less than 96% and large amounts of primary amino group and double bond of curing active site were detected.

When 60 g of the prepolymer was blended with 40 g of glass fiber 3 mm long and molded with press for 10 min at 230° C. and 150 kg/cm$^2$, a sufficiently cured molding was obtained with having no foam and void observed. After being aftercured at 200° C. for 24 hours, the molding was measured to determine properties. As a result, the product proved to be as excellent as the heat deflection temperature (ASTM-D648) of not less than 300° C. and the flexural strength 1,350 kg/cm$^2$.

EXAMPLE 4

DMF of 250 ml and 133 g (0.325 mole) of 4,4'-bis(p-aminophenoxy) diphenylpropane, which had been provided in a similar apparatus to that in Example 1, were dissolved with stirring. Next, a solution containing 65 g (0.5 mole) of monomethyl maleate dissolved in 100 ml of DMF was gradually added through the dropping funnel. After one hour of reaction at 60° C., a solution containing 78 g (ca. 0.6 dehydrating equivalent) of 114% polyphosphoric acid dissolved in 150 ml of DMF was gradually added and subsequently the mixture was heated to 100° C., followed by one hour of reaction at this temperature.

When the reaction mixture was subjected to the same post-treatment as Example 1, 160 g (yield: 92.5%) of light brown colored prepolymer was obtained.

As a result of subjecting the obtained prepolymer to the same analysis as Example 1, the ring closure rate was not less than 96% and primary amino group and double bond of the curing active site were detected in large amounts.

A DMF solution containing 45 weight % of the prepolymer was prepared and glass cloth subjected to silane treatment was impregnated with the obtained solution, followed by 30 minutes of drying at 100° C. and another one hour of drying at 160° C. in a drier. As a result, prepreg having 43% of resin adhesion was obtained. The prepreg was laminated and pressed with heating for 1 hour at 220° C. and 50 kg/cm$^2$. As a result, a laminate sheet having high toughness and no distortion was obtained It had an excellent flexural strength (ASTM-790) of 7,000 kg/cm$^2$.

EXAMPLE 5

Synthesis and post-treatment were conducted in the same manner as in Example 1, with the exception of using a mixture of 68.7 g (0.7 mole) of maleic anhydride and 48.0 g (0.3 mole) of nadic anhydride in place of 98.1 g (1.0 mole) of maleic anhydride. As a result, 233 g (yield: 94.2%) of light yellow colored prepolymer was obtained A 35 wt % DMF solution of the obtained prepolymer was prepared and carbon fiber cloth (Toray "Torayca" cloth #6142) was impregnated with the obtained solution, followed by 30 minutes of drying at 100° C. and another one hour of drying at 160° C. in a hot air drier. The result was prepreg having 40% of resin adhesion. The prepreg was laminated and heat pressed for one hour at 280° C. and 50 kg/cm$^2$ to prepare a laminate sheet having high toughness and no distortion. After being aftercured at 280° C. for 24 hours, the laminate sheet was measured to determine properties. The sheet proved to have excellent thermal and mechanical properties such as a flexural strength of 8,000 kg/cm$^2$ and flexural modulus of 550 t/cm$^2$ at room temperatures and a flexural strength of 7,900 kg/cm$^2$ and flexural modulus of 520 t/cm$^2$ at 200° C.

EXAMPLE 6

Maleic anhydride of 98.1 g (1.0 mcle) and 200 ml of NMP was provided in a similar apparatus to that in Example 1 and dissolved with stirring. Next, a solution containing 128.9 g (0.65 mcle) of 4,4'-diaminodiphenylmethane and 43.2 g (0.1 mole) of p-bis (4-aminophenoxy) diphenylsulfone dissolved in 300 ml of NMP was added gradually. After one hour of reaction at 30° C. following the addition, 142 g (1.0 mole) of phosphorus pentaoxide in a solid state was added, after which the reaction. mixture was heated to 90° C., followed by one hour of reaction at this temperature.

When the reaction mixture was post-treatment in the same manner as in Example 1, then 230 g (yield: 91.2%) of light brown prepolymer was obtained.

When the obtained prepolymer was analyzed in the same manner as in Example 1, the ring closure rate was not less than 96% and primary amino group and double bond of the curing active site were detected in large amounts.

As a result of press molding the obtained prepolymer at 230° C. and 70 kg/cm$^2$ for 10 minutes, an enough cured molding was obtained with having no foam and void produced. After being aftercured at 200° C. for 24 hours, the molding was measured to determine properties. The mclding proved to have excellent properties such as a flexural strength (ASTM-D790) of 1,400 kg/cm$^2$.

EXAMPLE 7

98.1 g (1.0 mole) of finely pulverized maleic anhydride 148.7 g (0.75 mole) of finely pulverized 4,4'-diaminodiphenylethane and 71 g (0.5 mole) of phosphorus pentaoxide were thoroughly mixed together in a henshel mixer. The content was transferred to a stainless steel-made vat, gradually heated to 150° C. over one hour in an oven, kept at this temperature for 20 minutes to continue reaction and thereafter cooled immediately.

After being taken out, the reaction mixture was vacuum dried at 70° C. for 17 hours through such processes in succession as grinding, washing with pure water, thoroughly washing with 1% sodium carbonate aqueous solution and pure water and desiccation. As a result, 222 g (yield: 97.0%) of light brown prepolymer was obtained.

When the obtained prepolymer was subjected to IR analysis, then large amounts of primary amino group and double bond were detected. On the other hand, as no absorption of amide acid was detected, nearly perfect imide ring closure was judged to be performed.

When 60 g of the obtained polyimide prepolymer was blended with 40 g of graphite and molded with press for 10 minutes at 230° C. and 150 kg/cm², a sufficiently cured molding was obtained with having no foam and void observed. After being aftercured at 200° C. for 24 hours, the molding showed excellent abrasion characteristics.

What we claim is:

1. A method for preparing a polyimide prepolymer, which comprises effecting reaction between a polyamine which has the following general formula (I), $$R(NH_2)_n \qquad (I)$$

in which R is an organic group having not less than 2 carbon atoms ad n is an integer of 2 or above, and a compound selected from the group consisting of dicarboxylic acids having at least one aliphatic double bond and derivatives thereof in the ratio of 0.52–0.95 mole of the latter per mole of amino group contained in the polyamine used, in contact with an effective ring closing amount of an oxide of phosphorus.

2. The method according to claim 1 wherein said oxide compound of phosphorus is selected from the group consisting of phosphorus pentaoxide and polyphosphoric acid.

3. The method according to claim 1 wherein said R in formula (I) is a radical selected from the group consisting of a benzene ring or radicals consisting of not less than 2 benzene rings linked to each other by a direct bond or a bonding group selected from the group consisting of —O—, —S—, —CO—, —SO₂— and

wherein R' is a radical selected from the group consisting of hydrogen, an aliphatic group, an aromatic group and an alicyclic group.

4. The method according to claim 1 wherein said polyamine is 4,4'-diaminodiphenylmethane.

5. The method according to claim 1 wherein said compound selected from the group consisting of dicarboxylic acids having aliphatic double bonds and the derivatives thereof is a dicarboxylic anhydride having an aliphatic double bond.

6. The method according to claim 5 wherein said dicarboxylic anhydride having an aliphatic double bond is maleic anhydride.

7. The method according to claim 1 wherein the oxide compound of phosphorus is used in an amount of 0.4—3 dehydrating equivalent per mole of compound selected from the group consisting of dicarboxylic acids having aliphatic double bonds and the derivatives thereof.

8. The method according to claim 1 wherein the compound selected from the group consisting of dicarboxylic acids having aliphatic double bonds and the derivatives thereof is used in an amount of 0.6–0.8 mole per mole of amino group contained in said polyamine.

9. The method according to claim 1 wherein the reaction is effected in the absence of solvent.

10. The method according to claim 1 wherein the reaction is effected in an aprotic polar solvent.

11. The method according to claim 10 wherein the reaction is started after the oxide compound of phosphorus is previously dissolved in an aprotic polar solvent.

12. The method according to claim 10 wherein said aprotic polar solvent is selected from the group consisting of dimethylformamide, N-methylpyrrolidone and dimethylacetamide.

13. The method according to claim 1 wherein the reaction is started in an organic medium capable of dissolving the reactants but not of dissolving more than 50 weight % of the resulting product.

14. The method according to claim 13 wherein said organic medium is a halogenated hydrocarbon.

15. The method according to claim 1 wherein the reaction is effected at a temperature of 70–200 ° C.

* * * * *

UNITED STATES PATENT AND TRADEMARK OFFICE
CERTIFICATE OF CORRECTION

PATENT NO. : 4,539,392
DATED : 9/3/85
INVENTOR(S) : Sho Kadoi and Toshihiko Aya

It is certified that error appears in the above-identified patent and that said Letters Patent is hereby corrected as shown below:

Column 11, line 16, delete "ad" and insert --and--.

Signed and Sealed this

Fourteenth Day of April, 1987

*Attest:*

DONALD J. QUIGG

*Attesting Officer*  *Commissioner of Patents and Trademarks*